US008870077B2

(12) United States Patent
Kato

(10) Patent No.: US 8,870,077 B2
(45) Date of Patent: Oct. 28, 2014

(54) WIRELESS IC DEVICE AND METHOD FOR MANUFACTURING SAME

(75) Inventor: Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 189 days.

(21) Appl. No.: 13/022,693

(22) Filed: Feb. 8, 2011

(65) Prior Publication Data

US 2011/0127336 A1 Jun. 2, 2011

Related U.S. Application Data

(63) Continuation of application No. PCT/JP2009/062801, filed on Jul. 15, 2009.

(30) Foreign Application Priority Data

Aug. 19, 2008 (JP) ................................ 2008-211200

(51) Int. Cl.

| | |
|---|---|
| ***G06K 19/06*** | (2006.01) |
| ***H01Q 1/22*** | (2006.01) |
| ***H01Q 7/00*** | (2006.01) |
| ***H01Q 19/30*** | (2006.01) |

(52) U.S. Cl.

CPC ............... *H01Q 1/2225* (2013.01); *H01Q 7/00* (2013.01); *H01Q 19/30* (2013.01)
USPC ........................ 235/492; 340/10.1; 340/572.7

(58) Field of Classification Search

CPC .................. G06K 19/07749; G06K 19/07786; G06K 19/0775
USPC .......... 235/492; 340/10.1–10.2, 572.1–572.7; 343/702
See application file for complete search history.

(56) References Cited

U.S. PATENT DOCUMENTS

| | | | |
|---|---|---|---|
| 3,364,564 | A | 1/1968 | Kurtz et al. |
| 4,794,397 | A | 12/1988 | Ohe et al. |

(Continued)

FOREIGN PATENT DOCUMENTS

| | | | |
|---|---|---|---|
| AU | 2006261571 | B2 | 12/2006 |
| CA | 2 279 176 | A1 | 7/1998 |

(Continued)

OTHER PUBLICATIONS

Ikemoto et al.: Radio IC Device; U.S. Appl. No. 12/981,582, filed Dec. 30, 2010.

(Continued)

*Primary Examiner* — Christopher Stanford
(74) *Attorney, Agent, or Firm* — Keating & Bennett, LLP

(57) ABSTRACT

A wireless IC device which functions as a non-contact RFID system even when the wireless IC device is attached to an article containing metal, water, salt or the like, without hindering reduction in size and thickness, and a method for manufacturing the same are obtained. The wireless IC device includes a wireless IC chip arranged to process a predetermined wireless signal, a feed circuit board on which the wireless IC chip is mounted, a loop-shaped electrode that is coupled to the wireless IC chip via the feed circuit board, and a first electrode plate and a second electrode plate that are coupled to the loop-shaped electrode. The loop-shaped electrode is sandwiched between the first electrode plate and the second electrode plate and is arranged such that the loop surface thereof is perpendicular to or tilted with respect to the first and the second electrode plates. At least the first electrode plate out of the first electrode plate and the second electrode plate is used for transmission and reception of the wireless signal.

6 Claims, 9 Drawing Sheets

(56) References Cited

U.S. PATENT DOCUMENTS 5,232,765 A 8/1993 Yano et al.
5,253,969 A 10/1993 Richert
5,337,063 A 8/1994 Takahira
5,374,937 A 12/1994 Tsunekawa et al.
5,399,060 A 3/1995 Richert
5,491,483 A 2/1996 D'Hont
5,528,222 A 6/1996 Moskowitz et al.
5,757,074 A 5/1998 Matloubian et al.
5,854,480 A 12/1998 Noto
5,903,239 A 5/1999 Takahashi et al.
5,936,150 A 8/1999 Kobrin et al.
5,955,723 A 9/1999 Reiner
5,995,006 A 11/1999 Walsh
6,104,311 A 8/2000 Lastinger
6,107,920 A 8/2000 Eberhardt et al.
6,172,608 B1 1/2001 Cole
6,181,287 B1 1/2001 Beigel
6,190,942 B1 2/2001 Wilm et al.
6,243,045 B1 6/2001 Ishibashi
6,249,258 B1 6/2001 Bloch et al.
6,259,369 B1 7/2001 Monico
6,271,803 B1 8/2001 Watanabe et al.
6,335,686 B1 1/2002 Goff et al.
6,362,784 B1 3/2002 Kane et al.
6,367,143 B1 4/2002 Sugimura
6,378,774 B1 4/2002 Emori et al.
6,406,990 B1 6/2002 Kawai
6,448,874 B1 9/2002 Shiino et al.
6,452,563 B1 9/2002 Porte
6,462,716 B1 10/2002 Kushihi
6,542,050 B1 4/2003 Arai et al.
6,600,459 B2 7/2003 Yokoshima et al.
6,634,564 B2 10/2003 Kuramochi
6,664,645 B2 12/2003 Kawai
6,763,254 B2 7/2004 Nishikawa
6,812,707 B2 11/2004 Yonezawa et al.
6,828,881 B2 12/2004 Mizutani et al.
6,837,438 B1 1/2005 Takasugi et al.
6,891,506 B2 * 5/2005 Jarmuszewski et al. ...... 343/702
6,897,810 B2 * 5/2005 Dai et al. ............... 343/700 MS
6,927,738 B2 8/2005 Senba et al.
6,956,481 B1 10/2005 Cole
6,963,729 B2 11/2005 Uozumi
7,088,249 B2 8/2006 Senba et al.
7,088,307 B2 8/2006 Imaizumi
7,112,952 B2 9/2006 Arai et al.
7,119,693 B1 10/2006 Devilbiss
7,129,834 B2 10/2006 Naruse et al.
7,248,221 B2 7/2007 Kai et al.
7,250,910 B2 7/2007 Yoshikawa et al.
7,276,929 B2 10/2007 Arai et al.
7,317,396 B2 1/2008 Ujino
7,405,664 B2 7/2008 Sakama et al.
8,169,322 B1 * 5/2012 Zhan et al. ................. 340/572.7
2001/0011012 A1 8/2001 Hino et al.
2002/0011967 A1 1/2002 Goff et al.
2002/0015002 A1 2/2002 Yasukawa et al.
2002/0044092 A1 4/2002 Kushihi
2002/0067316 A1 6/2002 Yokoshima et al.
2003/0006901 A1 1/2003 Kim et al.
2003/0020661 A1 1/2003 Sato
2003/0169153 A1 9/2003 Muller
2003/0169204 A1 * 9/2003 Saito ...................... 343/700 MS
2004/0001027 A1 1/2004 Killen et al.
2004/0026519 A1 2/2004 Usami et al.
2004/0056823 A1 3/2004 Zuk et al.
2004/0066617 A1 4/2004 Hirabayashi et al.
2004/0217915 A1 11/2004 Imaizumi
2004/0219956 A1 11/2004 Iwai et al.
2004/0227673 A1 11/2004 Iwai et al.
2005/0001031 A1 1/2005 Akiho et al.
2005/0092836 A1 5/2005 Kudo
2005/0099337 A1 5/2005 Takei et al.
2005/0125093 A1 6/2005 Kikuchi et al.
2005/0134460 A1 6/2005 Usami
2005/0134506 A1 6/2005 Egbert
2005/0138798 A1 6/2005 Sakama et al.
2005/0140512 A1 6/2005 Sakama et al.
2005/0232412 A1 10/2005 Ichihara et al.
2005/0236623 A1 10/2005 Takechi et al.
2005/0275539 A1 12/2005 Sakama et al.
2006/0001138 A1 1/2006 Sakama et al.
2006/0032926 A1 2/2006 Baba et al.
2006/0044192 A1 3/2006 Egbert
2006/0055531 A1 3/2006 Cook et al.
2006/0055601 A1 3/2006 Kameda et al.
2006/0071084 A1 4/2006 Detig et al.
2006/0109185 A1 5/2006 Iwai et al.
2006/0145872 A1 7/2006 Tanaka et al.
2006/0158380 A1 7/2006 Son et al.
2006/0170606 A1 8/2006 Yamagajo et al.
2006/0214801 A1 9/2006 Murofushi et al.
2006/0220871 A1 10/2006 Baba et al.
2006/0244568 A1 11/2006 Tong et al.
2006/0244676 A1 11/2006 Uesaka
2006/0267138 A1 11/2006 Kobayashi
2007/0004028 A1 1/2007 Lair et al.
2007/0018893 A1 1/2007 Kai et al.
2007/0040028 A1 2/2007 Kawamata
2007/0052613 A1 3/2007 Gallschuetz et al.
2007/0069037 A1 3/2007 Kawai
2007/0132591 A1 6/2007 Khatri
2007/0164414 A1 7/2007 Dokai et al.
2007/0200782 A1 8/2007 Hayama et al.
2007/0229276 A1 10/2007 Yamagajo et al.
2007/0247387 A1 10/2007 Kubo et al.
2007/0252700 A1 11/2007 Ishihara et al.
2007/0252703 A1 11/2007 Kato et al.
2007/0252763 A1 11/2007 Martin
2007/0285335 A1 12/2007 Bungo et al.
2007/0290928 A1 12/2007 Chang et al.
2008/0024156 A1 1/2008 Arai et al.
2008/0068132 A1 3/2008 Kayanakis et al.
2008/0070003 A1 3/2008 Nakatani et al.
2008/0087990 A1 4/2008 Kato et al.
2008/0143630 A1 6/2008 Kato et al.
2008/0169905 A1 7/2008 Slatter
2008/0184281 A1 7/2008 Ashizaki et al.
2008/0272885 A1 11/2008 Atherton
2008/0309578 A1 * 12/2008 Son et al. ...................... 343/860
2009/0002130 A1 1/2009 Kato
2009/0009007 A1 1/2009 Kato et al.
2009/0021352 A1 1/2009 Kataya et al.
2009/0021446 A1 1/2009 Kataya et al.
2009/0065594 A1 3/2009 Kato et al.
2009/0146883 A1 * 6/2009 Chin et al. ............. 343/700 MS
2009/0160719 A1 6/2009 Kato et al.
2009/0201116 A1 8/2009 Orihara
2009/0224061 A1 9/2009 Kato et al.
2009/0231106 A1 9/2009 Okamura
2009/0262041 A1 10/2009 Ikemoto et al.
2009/0266900 A1 10/2009 Ikemoto et al.
2009/0278687 A1 11/2009 Kato
2009/0321527 A1 12/2009 Kato et al.
2010/0103058 A1 4/2010 Kato et al.
2010/0182210 A1 7/2010 Ryou et al.
2010/0308118 A1 12/2010 Kataya et al.
2011/0031320 A1 2/2011 Kato et al.
2011/0063184 A1 3/2011 Furumura et al.

FOREIGN PATENT DOCUMENTS

DE 10 2006 057 369 A1 6/2008
EP 0 694 874 A2 1/1996
EP 0 848 448 A2 6/1998
EP 0 948 083 A2 10/1999
EP 0 977 145 A2 2/2000
EP 1 010 543 A1 6/2000
EP 1 085 480 A1 3/2001
EP 1 160 915 A2 12/2001
EP 1 170 795 A2 1/2002
EP 1 193 793 A2 4/2002
EP 1 227 540 A1 7/2002
EP 1 280 232 A1 1/2003

(56) References Cited

FOREIGN PATENT DOCUMENTS

| | | | |
|---|---|---|---|
| EP | 1 280 350 | A1 | 1/2003 |
| EP | 1 343 223 | A1 | 9/2003 |
| EP | 1 357 511 | A2 | 10/2003 |
| EP | 1 547 753 | A1 | 6/2005 |
| EP | 1 548 872 | A1 | 6/2005 |
| EP | 1 626 364 | A2 | 2/2006 |
| EP | 1 701 296 | A1 | 9/2006 |
| EP | 1 703 589 | A1 | 9/2006 |
| EP | 1 742 296 | A1 | 1/2007 |
| EP | 1 744 398 | A1 | 1/2007 |
| EP | 1 840 802 | A1 | 10/2007 |
| EP | 1 841 005 | A1 | 10/2007 |
| EP | 1 865 574 | A1 | 12/2007 |
| EP | 1 887 652 | A1 | 2/2008 |
| EP | 1 976 056 | A1 | 10/2008 |
| EP | 1 988 491 | A1 | 11/2008 |
| EP | 1 988 601 | A1 | 11/2008 |
| EP | 1 993 170 | A1 | 11/2008 |
| EP | 2 009 738 | A1 | 12/2008 |
| EP | 2 012 258 | A1 | 1/2009 |
| EP | 2 096 709 | A1 | 9/2009 |
| EP | 2 148 449 | A1 | 1/2010 |
| EP | 2 166 617 | A1 | 3/2010 |
| EP | 2 251 934 | A1 | 11/2010 |
| EP | 2 256 861 | A1 | 12/2010 |
| EP | 2 330 684 | A1 | 6/2011 |
| GB | 2 305 075 | A | 3/1997 |
| GB | 2461443 | A | 1/2010 |
| JP | 50-143451 | A | 11/1975 |
| JP | 61-284102 | A | 12/1986 |
| JP | 62-127140 | U | 8/1987 |
| JP | 01-212035 | A | 8/1989 |
| JP | 02-164105 | A | 6/1990 |
| JP | 02-256208 | A | 10/1990 |
| JP | 3-171385 | A | 7/1991 |
| JP | 03-503467 | A | 8/1991 |
| JP | 03-262313 | A | 11/1991 |
| JP | 04-150011 | A | 5/1992 |
| JP | 04-167500 | A | 6/1992 |
| JP | 04-096814 | U | 8/1992 |
| JP | 04-101168 | U | 9/1992 |
| JP | 04-134807 | U | 12/1992 |
| JP | 05-226926 | A | 9/1993 |
| JP | 05-327331 | A | 12/1993 |
| JP | 6-53733 | A | 2/1994 |
| JP | 06-077729 | A | 3/1994 |
| JP | 06-029215 | U | 4/1994 |
| JP | 06-177635 | A | 6/1994 |
| JP | 6-260949 | A | 9/1994 |
| JP | 07-183836 | A | 7/1995 |
| JP | 08-055725 | A | 2/1996 |
| JP | 08-056113 | A | 2/1996 |
| JP | 8-87580 | A | 4/1996 |
| JP | 08-088586 | A | 4/1996 |
| JP | 08-88586 | A | 4/1996 |
| JP | 08-176421 | A | 7/1996 |
| JP | 08-180160 | A | 7/1996 |
| JP | 08-279027 | A | 10/1996 |
| JP | 08-307126 | A | 11/1996 |
| JP | 08-330372 | A | 12/1996 |
| JP | 09-014150 | A | 1/1997 |
| JP | 09-035025 | A | 2/1997 |
| JP | 9-93029 | A | 4/1997 |
| JP | 09-093029 | A | 4/1997 |
| JP | 09-245381 | A | 9/1997 |
| JP | 09-252217 | A | 9/1997 |
| JP | 09-270623 | A | 10/1997 |
| JP | 09-284038 | A | 10/1997 |
| JP | 9-512367 | A | 12/1997 |
| JP | 10-69533 | A | 3/1998 |
| JP | 10-069533 | A | 3/1998 |
| JP | 10-505466 | A | 5/1998 |
| JP | 10-171954 | A | 6/1998 |
| JP | 10-173427 | A | 6/1998 |
| JP | 10-193849 | A | 7/1998 |
| JP | 10-193851 | A | 7/1998 |
| JP | 10-242742 | A | 9/1998 |
| JP | 10-293828 | A | 11/1998 |
| JP | 10-334203 | A | 12/1998 |
| JP | 11-025244 | A | 1/1999 |
| JP | 11-039441 | A | 2/1999 |
| JP | 11-075329 | A | 3/1999 |
| JP | 11-085937 | A | 3/1999 |
| JP | 11-88241 | A | 3/1999 |
| JP | 11-102424 | A | 4/1999 |
| JP | 11-103209 | A | 4/1999 |
| JP | 11-149536 | A | 6/1999 |
| JP | 11-149537 | A | 6/1999 |
| JP | 11-149538 | A | 6/1999 |
| JP | 11-175678 | A | 7/1999 |
| JP | 11-219420 | A | 8/1999 |
| JP | 11-220319 | A | 8/1999 |
| JP | 11-282993 | A | 10/1999 |
| JP | 11-328352 | A | 11/1999 |
| JP | 11-331014 | A | 11/1999 |
| JP | 11-346114 | A | 12/1999 |
| JP | 11-515094 | A | 12/1999 |
| JP | 2000-21128 | A | 1/2000 |
| JP | 2000-021639 | A | 1/2000 |
| JP | 2000-022421 | A | 1/2000 |
| JP | 2000-059260 | A | 2/2000 |
| JP | 2000-085283 | A | 3/2000 |
| JP | 2000-090207 | A | 3/2000 |
| JP | 2000-132643 | A | 5/2000 |
| JP | 2000-137778 | A | 5/2000 |
| JP | 2000-137779 | A | 5/2000 |
| JP | 2000-137785 | A | 5/2000 |
| JP | 2000-148948 | A | 5/2000 |
| JP | 2000-172812 | A | 6/2000 |
| JP | 2000-209013 | A | 7/2000 |
| JP | 2000-222540 | A | 8/2000 |
| JP | 2000-510271 | A | 8/2000 |
| JP | 2000-242754 | A | 9/2000 |
| JP | 2000-243797 | A | 9/2000 |
| JP | 2000-251049 | A | 9/2000 |
| JP | 2000-261230 | A | 9/2000 |
| JP | 2000-276569 | A | 10/2000 |
| JP | 2000-286634 | A | 10/2000 |
| JP | 2000-286760 | A | 10/2000 |
| JP | 2000-311226 | A | 11/2000 |
| JP | 2000-321984 | A | 11/2000 |
| JP | 3075400 | U | 11/2000 |
| JP | 2000-349680 | A | 12/2000 |
| JP | 2001-10264 | A | 1/2001 |
| JP | 2001-028036 | A | 1/2001 |
| JP | 2001-043340 | A | 2/2001 |
| JP | 2001-66990 | A | 3/2001 |
| JP | 2001-76111 | A | 3/2001 |
| JP | 2001-084463 | A | 3/2001 |
| JP | 2001-101369 | A | 4/2001 |
| JP | 2001-505682 | A | 4/2001 |
| JP | 2001-168628 | A | 6/2001 |
| JP | 2001-188890 | A | 7/2001 |
| JP | 2001-209767 | A | 8/2001 |
| JP | 2001-240046 | A | 9/2001 |
| JP | 2001-240217 | A | 9/2001 |
| JP | 2001-256457 | A | 9/2001 |
| JP | 2001-257292 | A | 9/2001 |
| JP | 2001-514777 | A | 9/2001 |
| JP | 2001-291181 | A | 10/2001 |
| JP | 2001-319380 | A | 11/2001 |
| JP | 2001-331976 | A | 11/2001 |
| JP | 2001-332923 | A | 11/2001 |
| JP | 2001-339226 | A | 12/2001 |
| JP | 2001-344574 | A | 12/2001 |
| JP | 2001-351083 | A | 12/2001 |
| JP | 2001-351084 | A | 12/2001 |
| JP | 2001-352176 | A | 12/2001 |
| JP | 2001-358527 | A | 12/2001 |
| JP | 2002-024776 | A | 1/2002 |
| JP | 2002-026513 | A | 1/2002 |
| JP | 2002-32731 | A | 1/2002 |
| JP | 2002-042076 | A | 2/2002 |
| JP | 2002-042083 | A | 2/2002 |

(56) References Cited

FOREIGN PATENT DOCUMENTS

| | | | |
|---|---|---|---|
| JP | 2002-063557 | A | 2/2002 |
| JP | 2002-505645 | A | 2/2002 |
| JP | 2002-76750 | A | 3/2002 |
| JP | 2002-076750 | A | 3/2002 |
| JP | 2002-111363 | A | 4/2002 |
| JP | 2002-150245 | A | 5/2002 |
| JP | 2002-157564 | A | 5/2002 |
| JP | 2002-158529 | A | 5/2002 |
| JP | 2002-175508 | A | 6/2002 |
| JP | 2002-183676 | A | 6/2002 |
| JP | 2002-183690 | A | 6/2002 |
| JP | 2002-185358 | A | 6/2002 |
| JP | 2002-204117 | A | 7/2002 |
| JP | 2002-521757 | A | 7/2002 |
| JP | 2002-522849 | A | 7/2002 |
| JP | 2002-230128 | A | 8/2002 |
| JP | 2002-232221 | A | 8/2002 |
| JP | 2002-246828 | A | 8/2002 |
| JP | 2002-252117 | A | 9/2002 |
| JP | 2002-259934 | A | 9/2002 |
| JP | 2002-280821 | A | 9/2002 |
| JP | 2002-298109 | A | 10/2002 |
| JP | 2002-308437 | A | 10/2002 |
| JP | 2002-319008 | A | 10/2002 |
| JP | 2002-319009 | A | 10/2002 |
| JP | 2002-319812 | A | 10/2002 |
| JP | 2002-362613 | A | 12/2002 |
| JP | 2002-366917 | A | 12/2002 |
| JP | 2002-373029 | A | 12/2002 |
| JP | 2002-373323 | A | 12/2002 |
| JP | 2002-374139 | A | 12/2002 |
| JP | 2003-006599 | A | 1/2003 |
| JP | 2003-016412 | A | 1/2003 |
| JP | 2003-022912 | A | 1/2003 |
| JP | 2003-026177 | A | 1/2003 |
| JP | 2003-030612 | A | 1/2003 |
| JP | 2003-037861 | A | 2/2003 |
| JP | 2003-44789 | A | 2/2003 |
| JP | 2003-046318 | A | 2/2003 |
| JP | 2003-58840 | A | 2/2003 |
| JP | 2003-067711 | A | 3/2003 |
| JP | 2003-069335 | A | 3/2003 |
| JP | 2003-076947 | A | 3/2003 |
| JP | 2003-76963 | A | 3/2003 |
| JP | 2003-78333 | A | 3/2003 |
| JP | 2003-078336 | A | 3/2003 |
| JP | 2003-085501 | A | 3/2003 |
| JP | 2003-085520 | A | 3/2003 |
| JP | 2003-87008 | A | 3/2003 |
| JP | 2003-87044 | A | 3/2003 |
| JP | 2003-099184 | A | 4/2003 |
| JP | 2003-099720 | A | 4/2003 |
| JP | 2003-099721 | A | 4/2003 |
| JP | 2003-110344 | A | 4/2003 |
| JP | 2003-132330 | A | 5/2003 |
| JP | 2003-134007 | A | 5/2003 |
| JP | 2003-155062 | A | 5/2003 |
| JP | 2003-158414 | A | 5/2003 |
| JP | 2003-168760 | A | 6/2003 |
| JP | 2003-179565 | A | 6/2003 |
| JP | 2003-187207 | A | 7/2003 |
| JP | 2003-187211 | A | 7/2003 |
| JP | 2003-188338 | A | 7/2003 |
| JP | 2003-188620 | A | 7/2003 |
| JP | 2003-198230 | A | 7/2003 |
| JP | 2003-209421 | A | 7/2003 |
| JP | 2003-216919 | A | 7/2003 |
| JP | 2003-218624 | A | 7/2003 |
| JP | 2003-233780 | A | 8/2003 |
| JP | 2003-242471 | A | 8/2003 |
| JP | 2003-243918 | A | 8/2003 |
| JP | 2003-249813 | A | 9/2003 |
| JP | 2003-529163 | A | 9/2003 |
| JP | 2003-288560 | A | 10/2003 |
| JP | 2003-309418 | A | 10/2003 |
| JP | 2003-317060 | A | 11/2003 |
| JP | 2003-331246 | A | 11/2003 |
| JP | 2003-332820 | A | 11/2003 |
| JP | 2003-536302 | A | 12/2003 |
| JP | 2004-040597 | A | 2/2004 |
| JP | 2004-505481 | A | 2/2004 |
| JP | 2004-082775 | A | 3/2004 |
| JP | 2004-88218 | A | 3/2004 |
| JP | 2004-93693 | A | 3/2004 |
| JP | 2004-096566 | A | 3/2004 |
| JP | 2004-096618 | A | 3/2004 |
| JP | 2004-126750 | A | 4/2004 |
| JP | 2004-127230 | A | 4/2004 |
| JP | 2004-140513 | A | 5/2004 |
| JP | 2004-163134 | A | 6/2004 |
| JP | 2004-213582 | A | 7/2004 |
| JP | 2004-519916 | A | 7/2004 |
| JP | 2004-234595 | A | 8/2004 |
| JP | 2004-253858 | A | 9/2004 |
| JP | 2004-527864 | A | 9/2004 |
| JP | 2004-280390 | A | 10/2004 |
| JP | 2004-282403 | A | 10/2004 |
| JP | 2004-287767 | A | 10/2004 |
| JP | 2004-295297 | A | 10/2004 |
| JP | 2004-297249 | A | 10/2004 |
| JP | 2004-297681 | A | 10/2004 |
| JP | 2004-304370 | A | 10/2004 |
| JP | 2004-319848 | A | 11/2004 |
| JP | 2004-326380 | A | 11/2004 |
| JP | 2004-334268 | A | 11/2004 |
| JP | 2004-336250 | A | 11/2004 |
| JP | 2004-343000 | A | 12/2004 |
| JP | 2004-362190 | A | 12/2004 |
| JP | 2004-362341 | A | 12/2004 |
| JP | 2004-362602 | A | 12/2004 |
| JP | 2005-5866 | A | 1/2005 |
| JP | 2005-18156 | A | 1/2005 |
| JP | 2005-033461 | A | 2/2005 |
| JP | 2005-064799 | A | 3/2005 |
| JP | 2005-124061 | A | 5/2005 |
| JP | 2005-128592 | A | 5/2005 |
| JP | 2005-129019 | A | 5/2005 |
| JP | 2005-135132 | A | 5/2005 |
| JP | 2005-136528 | A | 5/2005 |
| JP | 2005-137032 | A | 5/2005 |
| JP | 3653099 | B2 | 5/2005 |
| JP | 2005-165839 | A | 6/2005 |
| JP | 2005-167327 | A | 6/2005 |
| JP | 2005-167813 | A | 6/2005 |
| JP | 2005-190417 | A | 7/2005 |
| JP | 2005-191705 | A | 7/2005 |
| JP | 2005-192124 | A | 7/2005 |
| JP | 2005-204038 | A | 7/2005 |
| JP | 2005-210223 | A | 8/2005 |
| JP | 2005-210676 | A | 8/2005 |
| JP | 2005-210680 | A | 8/2005 |
| JP | 2005-217822 | A | 8/2005 |
| JP | 2005-229474 | A | 8/2005 |
| JP | 2005-236339 | A | 9/2005 |
| JP | 2005-244778 | A | 9/2005 |
| JP | 2005-252853 | A | 9/2005 |
| JP | 2005-275870 | A | 10/2005 |
| JP | 2005-284352 | A | 10/2005 |
| JP | 2005-284455 | A | 10/2005 |
| JP | 2005-293537 | A | 10/2005 |
| JP | 2005-295135 | A | 10/2005 |
| JP | 2005-311205 | A | 11/2005 |
| JP | 2005-321305 | A | 11/2005 |
| JP | 2005-322119 | A | 11/2005 |
| JP | 2005-335755 | A | 12/2005 |
| JP | 2005-340759 | A | 12/2005 |
| JP | 2005-345802 | A | 12/2005 |
| JP | 2005-346820 | A | 12/2005 |
| JP | 2005-352858 | A | 12/2005 |
| JP | 2006-13976 | A | 1/2006 |
| JP | 2006-013976 | A | 1/2006 |
| JP | 2006-025390 | A | 1/2006 |
| JP | 2006-031766 | A | 2/2006 |
| JP | 2006-033312 | A | 2/2006 |

(56) References Cited

FOREIGN PATENT DOCUMENTS

| | | | |
|---|---|---|---|
| JP | 2006-39902 | A | 2/2006 |
| JP | 2006-039947 | A | 2/2006 |
| JP | 2006-42059 | A | 2/2006 |
| JP | 2006-42097 | A | 2/2006 |
| JP | 2006-050200 | A | 2/2006 |
| JP | 2006-053833 | A | 2/2006 |
| JP | 2006-67479 | A | 3/2006 |
| JP | 2006-72706 | A | 3/2006 |
| JP | 2006-074348 | A | 3/2006 |
| JP | 2006-80367 | A | 3/2006 |
| JP | 2006-92630 | A | 4/2006 |
| JP | 2006-102953 | A | 4/2006 |
| JP | 2006-107296 | A | 4/2006 |
| JP | 2006-513594 | A | 4/2006 |
| JP | 2006-148462 | A | 6/2006 |
| JP | 2006-148518 | A | 6/2006 |
| JP | 2006-151402 | A | 6/2006 |
| JP | 2006-174151 | A | 6/2006 |
| JP | 2006-195795 | A | 7/2006 |
| JP | 2006-203187 | A | 8/2006 |
| JP | 2006-203852 | A | 8/2006 |
| JP | 2006-217000 | A | 8/2006 |
| JP | 2006-232292 | A | 9/2006 |
| JP | 2006-237674 | A | 9/2006 |
| JP | 2006-238282 | A | 9/2006 |
| JP | 2006-246372 | A | 9/2006 |
| JP | 2006-270212 | A | 10/2006 |
| JP | 2006-270681 | A | 10/2006 |
| JP | 2006-270766 | A | 10/2006 |
| JP | 2006-285911 | A | 10/2006 |
| JP | 2006-287659 | A | 10/2006 |
| JP | 2006-295879 | A | 10/2006 |
| JP | 2006-302219 | A | 11/2006 |
| JP | 2006-309401 | A | 11/2006 |
| JP | 2006-311239 | A | 11/2006 |
| JP | 2006-323481 | A | 11/2006 |
| JP | 2006-339964 | A | 12/2006 |
| JP | 2007-007888 | A | 1/2007 |
| JP | 2007-13120 | A | 1/2007 |
| JP | 2007-18067 | A | 1/2007 |
| JP | 2007-019905 | A | 1/2007 |
| JP | 2007-28002 | A | 2/2007 |
| JP | 2007-040702 | A | 2/2007 |
| JP | 2007-043535 | A | 2/2007 |
| JP | 2007-048126 | A | 2/2007 |
| JP | 2007-65822 | A | 3/2007 |
| JP | 2007-79687 | A | 3/2007 |
| JP | 2007-81712 | A | 3/2007 |
| JP | 2007-096768 | A | 4/2007 |
| JP | 2007-102348 | A | 4/2007 |
| JP | 2007-116347 | A | 5/2007 |
| JP | 2007-122542 | A | 5/2007 |
| JP | 2007-150642 | A | 6/2007 |
| JP | 2007-150868 | A | 6/2007 |
| JP | 2007-159083 | A | 6/2007 |
| JP | 2007-159129 | A | 6/2007 |
| JP | 2007-166133 | A | 6/2007 |
| JP | 3975918 | B2 | 6/2007 |
| JP | 2007-172369 | A | 7/2007 |
| JP | 2007-172527 | A | 7/2007 |
| JP | 2007-524942 | A | 8/2007 |
| JP | 2007-228254 | A | 9/2007 |
| JP | 2007-228325 | A | 9/2007 |
| JP | 2007-233597 | A | 9/2007 |
| JP | 2007-241789 | A | 9/2007 |
| JP | 2007-266999 | A | 10/2007 |
| JP | 2007-272264 | A | 10/2007 |
| JP | 2007-287128 | A | 11/2007 |
| JP | 2007-295557 | A | 11/2007 |
| JP | 2007-312350 | A | 11/2007 |
| JP | 2007-324865 | A | 12/2007 |
| JP | 2008-033716 | A | 2/2008 |
| JP | 2008-042910 | A | 2/2008 |
| JP | 2008-72243 | A | 3/2008 |
| JP | 2008-083867 | A | 4/2008 |
| JP | 2008-092131 | A | 4/2008 |
| JP | 2008-097426 | A | 4/2008 |
| JP | 2008-098993 | A | 4/2008 |
| JP | 4069958 | B2 | 4/2008 |
| JP | 2008-103691 | A | 5/2008 |
| JP | 2008-107947 | A | 5/2008 |
| JP | 2008-513888 | A | 5/2008 |
| JP | 2008-148345 | A | 6/2008 |
| JP | 2008-519347 | A | 6/2008 |
| JP | 2008-160874 | A | 7/2008 |
| JP | 2008-167190 | A | 7/2008 |
| JP | 2008-197714 | A | 8/2008 |
| JP | 2008-535372 | A | 8/2008 |
| JP | 2008-207875 | A | 9/2008 |
| JP | 2008-217406 | A | 9/2008 |
| JP | 2008-288915 | A | 11/2008 |
| JP | 2009-017284 | A | 1/2009 |
| JP | 2009-021970 | A | 1/2009 |
| JP | 2009-25870 | A | 2/2009 |
| JP | 2009-27291 | A | 2/2009 |
| JP | 2009-044647 | A | 2/2009 |
| JP | 2009-044715 | A | 2/2009 |
| JP | 3148168 | U | 2/2009 |
| JP | 2009-110144 | A | 5/2009 |
| JP | 2009-153166 | A | 7/2009 |
| JP | 2009-182630 | A | 8/2009 |
| JP | 2009-213169 | A | 9/2009 |
| JP | 2010-009196 | A | 1/2010 |
| JP | 2010-050844 | A | 3/2010 |
| JP | 2010-081571 | | 4/2010 |
| JP | 4609604 | B2 | 1/2011 |
| NL | 9100176 | A | 3/1992 |
| NL | 9100347 | A | 3/1992 |
| WO | 98/33142 | A1 | 7/1998 |
| WO | 99/67754 | A1 | 12/1999 |
| WO | 00/10122 | A2 | 2/2000 |
| WO | 01/95242 | A2 | 12/2001 |
| WO | 02/48980 | A1 | 6/2002 |
| WO | 02/061675 | A1 | 8/2002 |
| WO | 02/097723 | A1 | 12/2002 |
| WO | 03/079305 | A1 | 9/2003 |
| WO | 2004/036772 | A2 | 4/2004 |
| WO | 2004/070879 | A | 8/2004 |
| WO | 2004/072892 | A2 | 8/2004 |
| WO | 2005/073937 | A | 8/2005 |
| WO | 2005/091434 | A1 | 9/2005 |
| WO | 2005/115849 | A1 | 12/2005 |
| WO | 2006/045682 | A | 5/2006 |
| WO | 2006/048663 | A1 | 5/2006 |
| WO | 2006/097918 | A2 | 9/2006 |
| WO | 2006/114821 | A1 | 11/2006 |
| WO | 2006/135956 | A1 | 12/2006 |
| WO | 2007/083574 | A1 | 7/2007 |
| WO | 2007/083575 | A1 | 7/2007 |
| WO | 2007/086130 | A1 | 8/2007 |
| WO | 2007/094494 | A1 | 8/2007 |
| WO | 2007/097385 | A1 | 8/2007 |
| WO | 2007/102360 | A1 | 9/2007 |
| WO | 2007/105348 | A1 | 9/2007 |
| WO | 2007/119310 | A1 | 10/2007 |
| WO | 2007/125683 | A1 | 11/2007 |
| WO | 2007/132094 | A1 | 11/2007 |
| WO | 2007/138857 | A1 | 12/2007 |
| WO | 2008/007606 | A | 1/2008 |
| WO | 2008/081699 | A1 | 7/2008 |
| WO | 2008/126458 | A1 | 10/2008 |
| WO | 2008/133018 | A1 | 11/2008 |
| WO | 2008/140037 | A1 | 11/2008 |
| WO | 2008/142957 | A1 | 11/2008 |
| WO | 2009/008296 | A1 | 1/2009 |
| WO | 2009/011144 | A1 | 1/2009 |
| WO | 2009/011376 | A1 | 1/2009 |
| WO | 2009/011400 | A1 | 1/2009 |
| WO | 2009/011423 | A1 | 1/2009 |
| WO | 2009/081719 | A1 | 7/2009 |
| WO | 2009/110381 | A1 | 9/2009 |
| WO | 2009/119548 | A1 | 10/2009 |
| WO | 2009/128437 | A1 | 10/2009 |
| WO | 2010/026939 | A1 | 3/2010 |

(56) References Cited

FOREIGN PATENT DOCUMENTS

OTHER PUBLICATIONS

Ikemoto et al.: Wireless IC Device and Electronic Apparatus; U.S. Appl. No. 13/022,695, filed Feb. 8, 2011.
Kato et al.: "Wireless IC Device"; U.S. Appl. No.12/390,556, filed Feb. 23, 2009.
Kato et al.: "Wireless IC Device," U.S. Application No. 12/603,608, filed Oct. 22, 2009.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in corresponding European Patent Application No. 09808153.2, mailed on Aug. 8, 2012.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No.11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.

(56) References Cited

OTHER PUBLICATIONS

Nagai, "Mounting Technique of RFID by Roll-To-Roll Process", Material Stage, Technical Information Institute Co., LTD, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.

(56) References Cited

OTHER PUBLICATIONS

Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.

* cited by examiner

WIRELESS IC DEVICE AND METHOD FOR MANUFACTURING SAME

BACKGROUND OF THE INVENTION

1. Field of the Invention

The present invention relates to a wireless IC device, and more particularly, to a wireless IC device which is preferably used in a non-contact RFID (Radio Frequency Identification) system, and a method for manufacturing the same.

2. Description of the Related Art

In recent years, wireless IC devices including a wireless IC chip which can electronically store information for article management and process a predetermined wireless signal, and an antenna which performs transmission and reception of the wireless signal between the wireless IC chip and a reader/writer have been attracting attention because of their various capabilities. A system using such a wireless IC device is generally called an RFID system, and can be used for individual authentication and transmission and reception of data in various occasions in accordance with a combination of a wireless IC device (in the form of card, tag, inlet, etc.) and a reader/writer which reads from and writes to the wireless IC device.

Meanwhile, in such a non-contact RFID system, if an article to be attached to the wireless IC device contains metal, water, salt or the like, an eddy current is generated in the article, and therefore the antenna might not operate properly due to the eddy current. That is, when the antenna is attached to the article in a planar manner, an electromagnetic wave is absorbed due to the eddy current in a wireless IC device though depending on the frequency, especially one which operates in a high-frequency band, whereby the transmission and reception of information may fail or may be disabled.

Therefore, for wireless IC devices which operate in an HF band, a method in which a magnetic member is disposed between the antenna and the article has been proposed (for example, see Japanese Unexamined Patent Application Publication No. 2004-304370, Japanese Unexamined Patent Application Publication No. 2005-340759 and Japanese Unexamined Patent Application Publication No. 2006-13976). For wireless IC devices which operate in a UHF band, a method in which the antenna is disposed so as to be apart from the article has been proposed (see Japanese Unexamined Patent Application Publication No. 2007-172369 and Japanese Unexamined Patent Application Publication No. 2007-172527).

However, it is required that wireless IC devices be small and thin for various applications. When a magnetic member is disposed between the antenna and the article or when the antenna is disposed so as to be apart from the article, reduction in size and thickness cannot be fully achieved.

SUMMARY OF THE INVENTION

Accordingly, preferred embodiments of the present invention provide a wireless IC device which functions as a non-contact RFID system even when the wireless IC device is attached to an article containing metal, water, salt or the like, without hindering reduction in size and thickness, and a method for manufacturing the same.

A wireless IC device according to a preferred embodiment of the present invention includes a wireless IC arranged to process a predetermined wireless signal, a loop-shaped electrode coupled to the wireless IC, and a first electrode plate and a second electrode plate coupled to the loop-shaped electrode, wherein the loop-shaped electrode is sandwiched between the first electrode plate and the second electrode plate, the loop-shaped electrode is arranged such that the loop surface thereof is perpendicular or tilted with respect to the first electrode plate and the second electrode plate, and at least the first electrode plate is used for transmission and reception of the wireless signal.

According to another preferred embodiment of the present invention, a method for manufacturing a wireless IC device including a wireless IC arranged to process a predetermined wireless signal, a loop-shaped electrode coupled to the wireless IC, and a first electrode plate and a second electrode plate coupled to the loop-shaped electrode, wherein the loop-shaped electrode is sandwiched between the first electrode plate and the second electrode plate, the loop-shaped electrode is disposed such that the loop surface thereof is perpendicular to or tilted with respect to the first electrode plate and the second electrode plate, and at least the first electrode plate is used for transmission and reception of the wireless signal, includes a step of patterning the first electrode plate and the loop-shaped electrode on a sheet of a metallic plate, and bending the loop-shaped electrode so as to be perpendicular to or tilted with respect to the first electrode plate.

In the wireless IC device, since the loop-shaped electrode coupled to the wireless IC is sandwiched between the first electrode plate and the second electrode plate and is disposed such that the loop surface thereof is perpendicular to or tilted with respect to the first electrode plate and the second electrode plate, a magnetic field passing through the loop surface generates a magnetic field substantially parallel to the first electrode plate and the second electrode plate and a magnetic field electromagnetically coupled to the first electrode plate and the second electrode plate. In addition, the wireless IC is coupled to the first electrode plate and the second electrode plate via the loop-shaped electrode with very small loss of energy. In addition, the first electrode plate is mainly used for transmission and reception of a wireless signal, and the second electrode plate mainly functions as a shielding plate that shields against interruptions from or to other articles and also functions as a radiation plate particularly when the area of the second electrode plate is larger than that of the first electrode plate. In this case, the directivity is improved as the gain increases. Therefore, even when the present wireless IC device is attached to an article containing metal, water, salt or the like, the wireless IC device functions as a non-contact RFID system if the second electrode plate is disposed so as to face the article side.

According to various preferred embodiments of the present invention, since the wireless IC is coupled to the first electrode plate and the second electrode plate via the loop-shaped electrode, and the loop-shaped electrode is sandwiched between the first electrode plate and the second electrode plate and is disposed such that the loop surface thereof is perpendicular to or tilted with respect to the first electrode plate and the second electrode plate, the wireless IC device achieves significant reductions in size and thickness, and functions as a non-contact RFID system even when the wireless IC device is attached to an article containing metal, water, salt or the like.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A and 1B illustrate a wireless IC device of a first preferred embodiment of the present invention, wherein FIG. 1A is a front view and FIG. 1B is a plan view.

DETAILED DESCRIPTION OF THE PREFERRED EMBODIMENTS

Preferred embodiments of a wireless IC device and a method for manufacturing the same according to the present invention will be explained with reference to the accompanying drawings. Note that similar elements and sections are denoted by the same symbols, and repeated explanation will be omitted.

First Preferred Embodiment

Figure 1A:
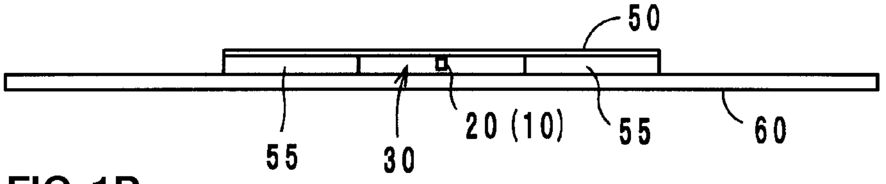
Figure 1B:
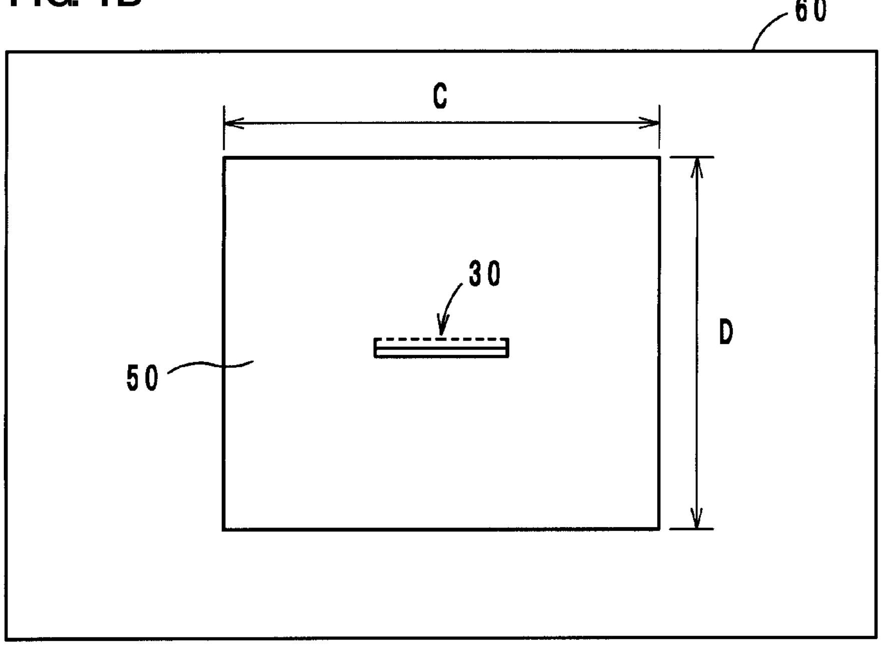
Figure 4:
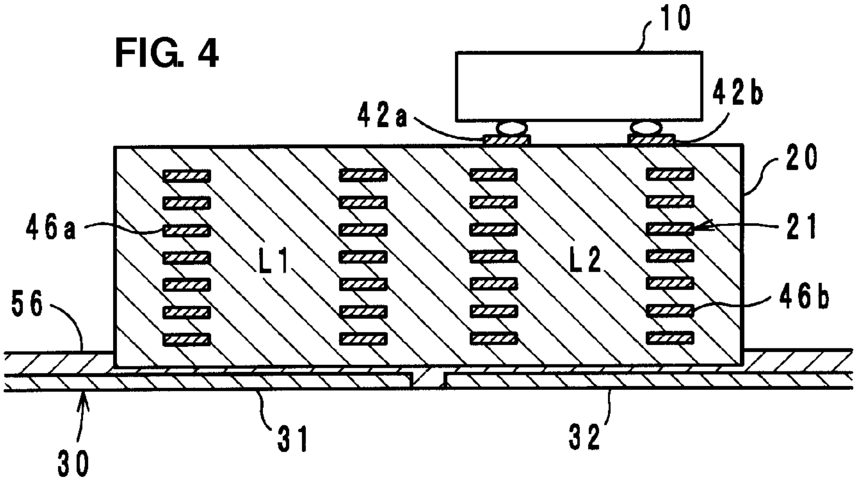
FIG. 4 is a sectional view illustrating a feed circuit board of the wireless IC device of the first preferred embodiment of the present invention.

As shown in FIGS. 1A and 1B, a wireless IC device according to a first preferred embodiment of the present invention, is constituted by a feed circuit board 20 on which a wireless IC chip 10 (see FIG. 4) that processes transmission and reception signals having a predetermined frequency is mounted, a loop-shaped electrode 30 that is coupled to the wireless IC chip 10 via the feed circuit board 20, and a first electrode plate 50 and a second electrode plate 60 that are coupled to the loop-shaped electrode 30.

Figure 2:
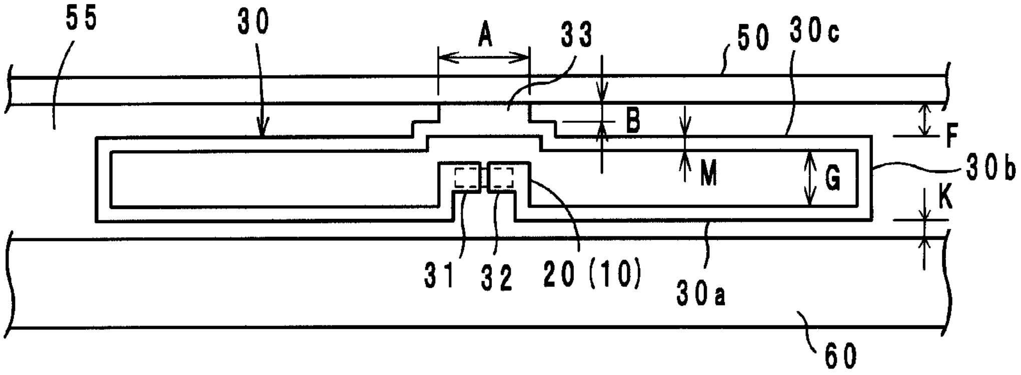
FIG. 2 is a front view illustrating a main section of the wireless IC device of the first preferred embodiment of the present invention.

As shown in FIG. 2, the loop-shaped electrode 30 is sandwiched between the first electrode plate 50 and the second electrode plate 60 and is disposed such that the loop surface thereof is perpendicular to (or tilted with respect to) the first electrode plate 50 and the second electrode plate 60. The first electrode plate 50 and the second electrode plate 60 may be formed of either a magnetic material or a non-magnetic material as long as the material is a metal such as iron or aluminum. In addition to the loop-shaped electrode 30 and the feed circuit board 20, a resin material 55 is filled between the first electrode plate 50 and the second electrode plate 60. In FIGS. 1A and 1B, the second electrode plate 60 has an area larger than that of the first electrode plate 50 but may have the same area as that of the first electrode plate 50.

Figure 3:
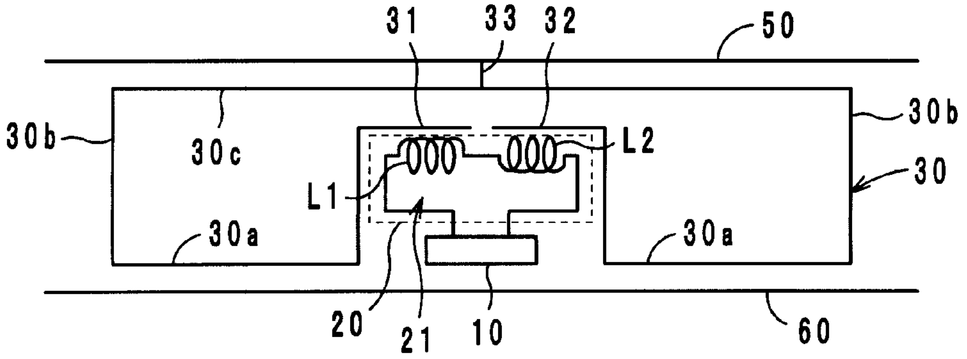
FIG. 3 is an equivalent circuit diagram of the wireless IC device of the first preferred embodiment of the present invention.

The feed circuit board 20 includes a feed circuit 21 including a resonance circuit operating at a predetermined resonant frequency (and may include an impedance matching circuit). As shown in FIG. 3, the feed circuit 21 includes two coil-shaped inductance elements L1 and L2. The inductance elements L1 and L2 are electromagnetically coupled to end coupling portions 31 and 32 of the loop-shaped electrode 30. The loop-shaped electrode 30 includes a first section 30*a*, a second section 30*b* and a third section 30*c*. The loop-shaped electrode is electrically coupled (DC direct coupling) to the first electrode plate 50 at a coupling portion 33 located at the center of the third section 30*c*, and electromagnetically coupled to the second electrode plate 60 at the first section 30*a*.

The wireless IC chip 10 includes a clock circuit, a logic circuit, a memory circuit and so on, and stores necessary information therein. The back surface thereof is provided with a pair of input/output terminal electrodes and a pair of mounting terminal electrodes. The input/output terminal electrodes and the mounting terminal electrodes are electrically connected to feed terminal electrodes 42*a* and 42*b* (see FIGS. 4 and 5) provided on the feed circuit board 20 and mounting electrodes 43*a* and 43*b*, respectively, preferably via metallic bumps, for example. The feed circuit board 20 is attached to the loop-shaped electrode 30 preferably by using a resin adhesive agent 56, for example, such that the inductance elements L1 and L2 respectively face the end coupling portions 31 and 32 of the loop-shaped electrode 30.

The inductance elements L1 and L2 included in the feed circuit 21 are magnetically coupled to each other with a reverse phase relationship to form a wider bandwidth, resonate with the frequency that the wireless IC chip 10 processes, and are electromagnetically coupled to the loop-shaped electrode 30. In addition, the feed circuit 21 performs matching between the impedance (normally 50Ω) of the wireless IC chip 10 and the impedance (space impedance of 377Ω) of the first electrode plate 50 and the second electrode plate 60.

Therefore, the feed circuit 21 transfers a transmission signal having a predetermined frequency transmitted from the wireless IC chip 10 to the first electrode plate 50 (and the second electrode plate 60), and selects a reception signal having a predetermined frequency from signals received by the first electrode plate 50 (and the second electrode plate 60) to supply the signal to the wireless IC chip 10. Thus, in this wireless IC device, the wireless IC chip 10 is operated by a signal received by the first electrode plate 50 (and the second electrode plate 60) and a reply signal from the wireless IC chip 10 is emitted to the outside from the first electrode plate 50 (and the second electrode plate 60).

Figure 6:
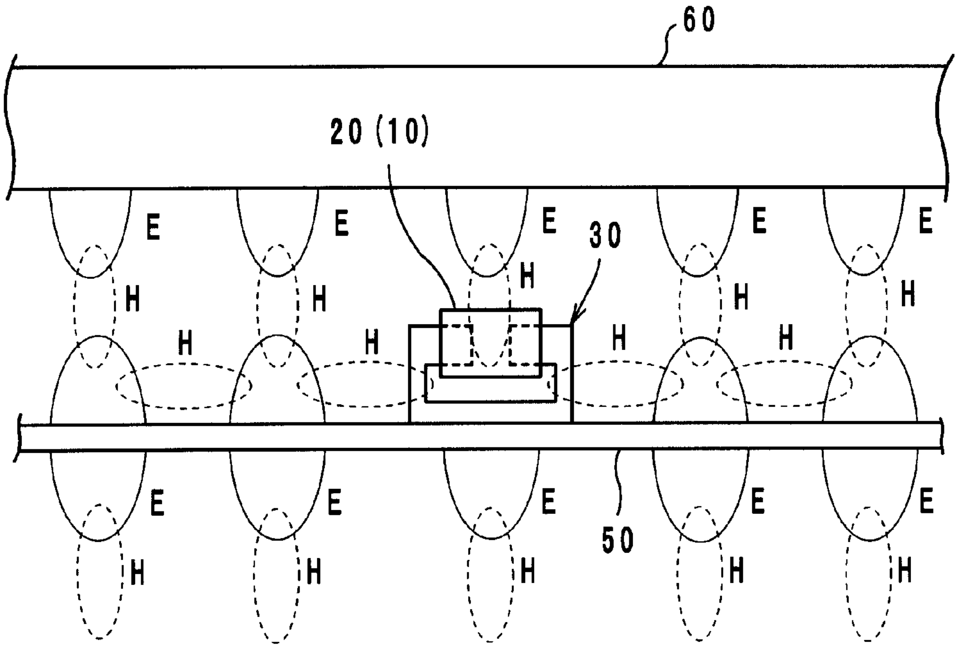
FIG. 6 is an explanatory diagram illustrating an operation principle of a wireless IC device according to a preferred embodiment of the present invention.

Here, an operation principle of the present wireless IC device is explained with reference to FIGS. 6 and 7. FIG. 6 schematically shows the distribution of electromagnetic fields (magnetic field H and electric field E) generated by the loop-shaped electrode 30. Since the loop-shaped electrode 30 is disposed perpendicularly to the first electrode plate 50, a magnetic field H is generated parallel or substantially parallel to the surface of the first electrode plate 50 and this induces an electric field E substantially perpendicular to the surface of the first electrode plate 50. A loop of this electric field E induces another loop of a magnetic field H, and due to this chain reaction, the distribution of electromagnetic fields widens.

Figure 7:
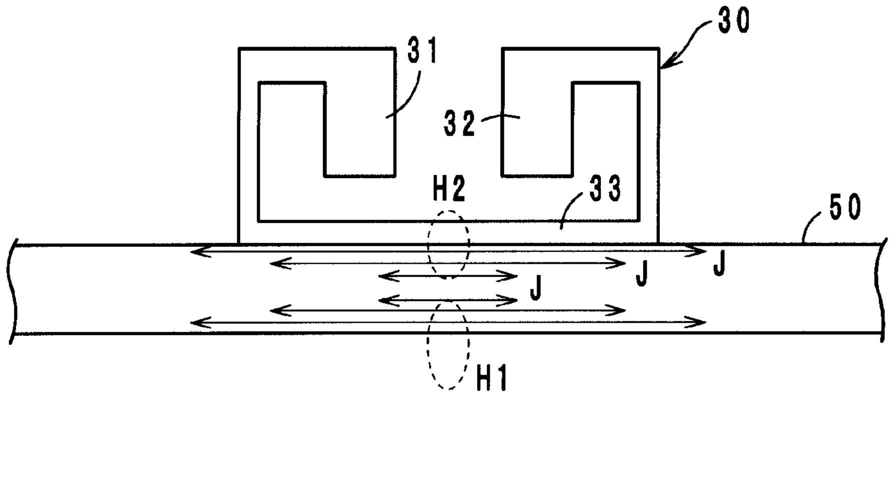
FIG. 7 is another explanatory diagram illustrating an operation principle of the wireless IC device according to a preferred embodiment of the present invention.

In addition, as shown in FIG. 7, due to a high-frequency signal (magnetic field H1) from the reader/writer, an eddy current J is generated all over the surface of the first electrode plate 50, and this eddy current J causes a magnetic field H2 to be generated in a direction perpendicular to the surface of the first electrode plate 50. Then, the loop-shaped electrode 30 is coupled to the magnetic field H2.

Accordingly, the first electrode plate 50 is mainly used for transmission and reception of a wireless signal, and the second electrode plate 60, which is capacitively coupled to the first electrode plate 50, mainly functions as a shielding plate that shields against interruptions from other articles. Therefore, even when the present wireless IC device is attached to an article containing metal, water, salt or the like, the wireless IC device functions as a non-contact RFID system if the second electrode plate 60 is disposed so as to face the article side. In addition, when the area of the second electrode plate is larger than that of the first electrode plate 50, the second electrode plate 60 also functions as a radiation plate. In this case, the directivity is improved as the gain increases. The loop-shaped electrode 30 can be formed to have a height of about 10 mm or less, or even about 1 mm or less, for example, whereby reduction in size and thickness of the wireless IC device is not hindered. Note that, when the second electrode plate 60 is cylindrical, the directivity pattern of emission signals becomes generally circular, whereby it is possible to transmit and receive a signal from and to the second electrode plate 60, too.

In the present first preferred embodiment, the feed circuit board 20 preferably has the following functions. Since the resonant frequency of a signal is set by the feed circuit 21 provided on the feed circuit board 20, the present wireless IC device operates on its own even when the wireless IC device is attached to various articles, and fluctuation in radiation characteristics is prevented. Therefore, there is no need to change the design of the first electrode plate 50 and the second electrode plate 60 for individual articles. In addition, the frequency of a transmission signal emitted from the first electrode plate 50 (and the second electrode plate 60) and the frequency of a reception signal supplied to the wireless IC chip substantially correspond to the resonant frequency of the feed circuit 21 in the feed circuit board 20. Therefore, stable frequency characteristics can be obtained.

Figure 5:
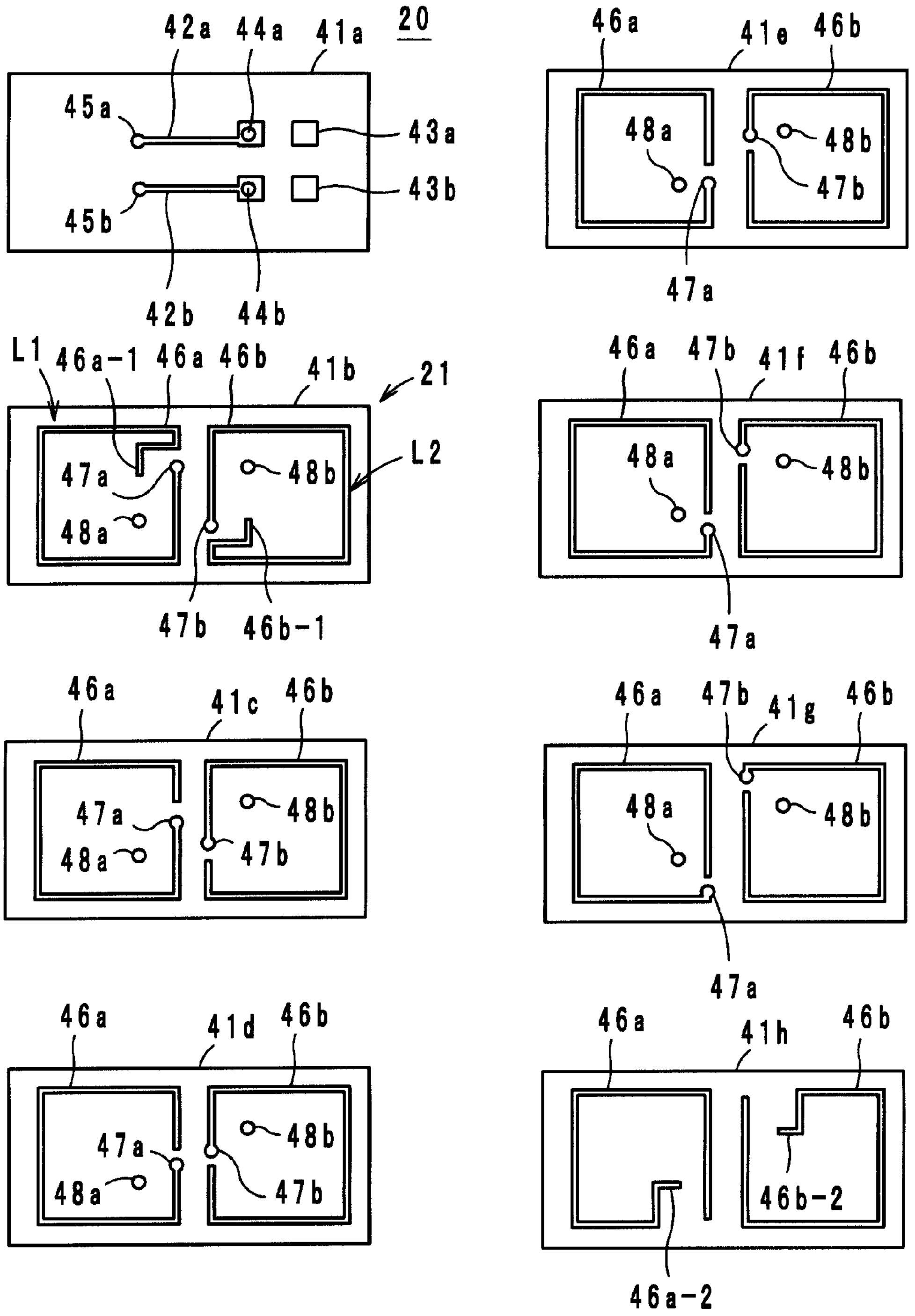
FIG. 5 is an exploded view illustrating a layered structure of the feed circuit board of the wireless IC device of the first preferred embodiment of the present invention.

Here, the configuration of the feed circuit board 20 is explained with reference to FIG. 5. The feed circuit board 20 is preferably formed by laminating, pressure bonding and firing ceramic sheets 41*a* to 41*h* made of a dielectric material or a magnetic material. The top layer sheet 41*a* is provided with the feed terminal electrodes 42*a* and 42*b*, mounting electrodes 43*a* and 43*b*, and via hole conductors 44*a*, 44*b*, 45*a* and 45*b*. Each of the second to eighth layer sheets 41*b* to 41*h* is provided with wiring electrodes 46*a* and 46*b* forming the inductance elements L1 and L2. As necessary, via hole conductors 47*a*, 47*b*, 48*a* and 48*b* may be formed.

By laminating the sheets 41*a* to 41*h*, the inductance element L1 in which the wiring electrodes 46*a* are spirally connected at the via hole conductors 47*a*, and the inductance element L2 in which the wiring electrodes 46*b* are spirally connected at the via hole conductors 47*b* are formed. In addition, a capacitance is formed between the wiring electrodes 46*a* and 46*b*.

An end section 46*a*-1 of the wiring electrode 46*a* on the sheet 41*b* is connected to the feed terminal electrode 42*a* via the via hole conductor 45*a*. An end section 46*a*-2 of the wiring electrode 46*a* on the sheet 41*h* is connected to the feed terminal electrode 42*b* via the via hole conductors 48*a* and 45*b*. An end section 46*b*-1 of the wiring electrode 46*b* on the sheet 41*b* is connected to the feed terminal electrode 42*b* via the via hole conductor 44*b*. An end section 46*b*-2 of the wiring electrode 46*b* on the sheet 41*h* is connected to the feed terminal electrode 42*a* via the via hole conductors 48*b* and 44*a*.

In the feed circuit 21 described above, the inductance elements L1 and L2 are respectively wounded in opposite directions, whereby magnetic fields generated in the inductance elements L1 and L2 are cancelled out. Since the magnetic fields are cancelled out, it is necessary to increase the length of the wiring electrodes 46*a* and 46*b* to some extent in order to obtain a desired inductance value. This reduces the Q value and so the steepness of the resonance characteristic disappears, whereby a wider bandwidth is formed near the resonant frequency.

The inductance elements L1 and L2 are preferably arranged at different positions in the right and left when the feed circuit board 20 is viewed in plan view. In addition, the magnetic fields generated in the inductance elements L1 and L2 are opposite each other. Therefore, when the feed circuit 21 is coupled to the end coupling portions 31 and 32 of the loop-shaped electrode 30, currents flowing in opposite directions are excited in the coupling portions 31 and 32, and signals can be transmitted and received via the loop-shaped electrode 30. Note that, the inductance elements L1 and L2 may be electrically connected to the coupling portions 31 and 32.

Note that, the feed circuit board 20 may be a multilayer board made of ceramic or resin, or may be a board in which flexible sheets made of a dielectric material such as polyimide or liquid crystal polymer are laminated, for example. In particular, when the inductance elements L1 and L2 are embedded in the feed circuit board 20, the feed circuit 21 is less likely to be influenced by the outside of the board, whereby fluctuation in radiation characteristics is prevented and minimized.

Note that, in the wireless IC device which is the present first preferred embodiment, the feed circuit board 20 may not be required, and the wireless IC chip 10 may be directly coupled to the coupling portions 31 and 32 of the loop-shaped electrode 30.

Figure 8:
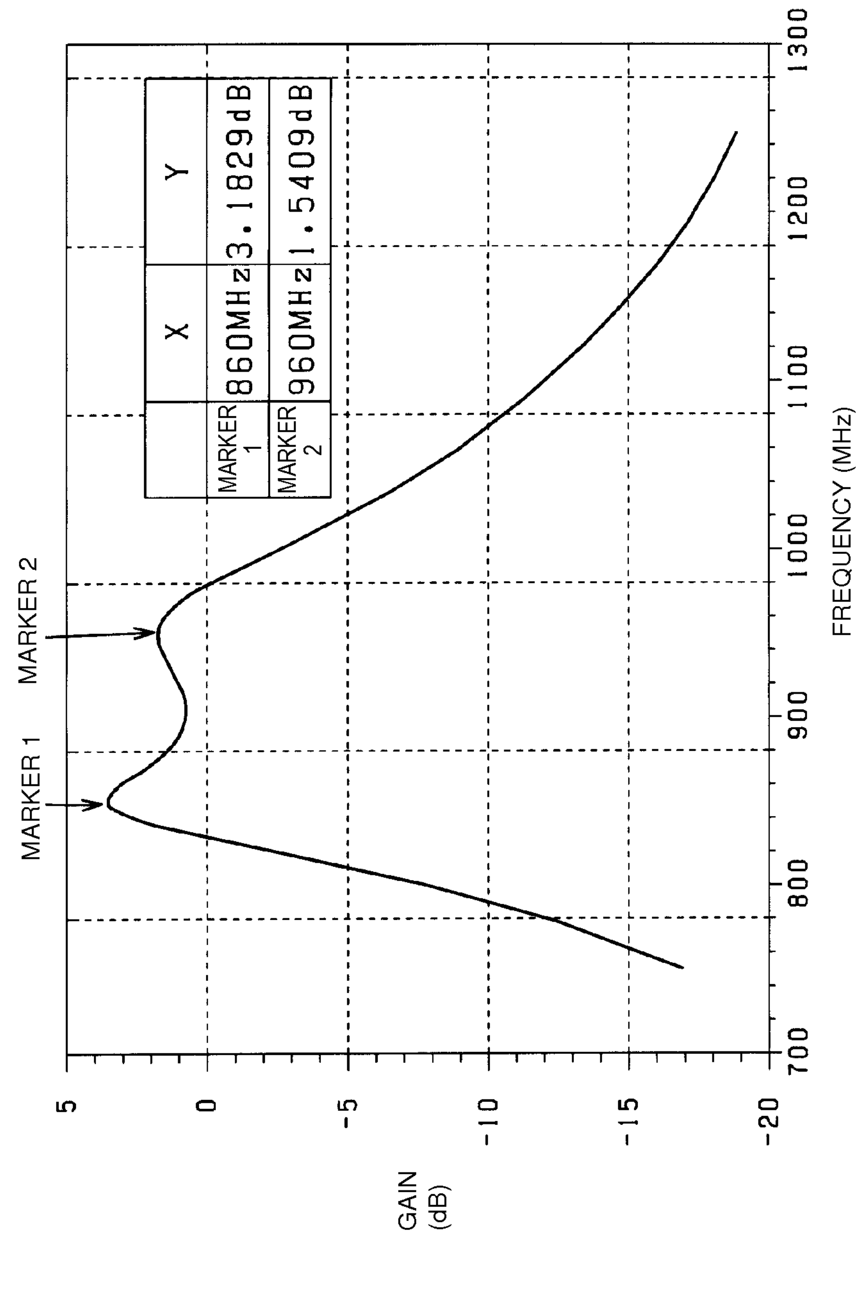
FIG. 8 is a graph illustrating a gain characteristic of the wireless IC device of the first preferred embodiment of the present invention.

The gain characteristic of the present wireless IC device obtained by using the loop-shaped electrode 30 is shown in FIG. 8. Data in FIG. 8 is obtained by using the following specifications. The second electrode plate 60 preferably has dimensions of approximately 30×30 mm and a thickness of about 3 mm, for example. The first electrode plate 50 preferably has a horizontal width C of about 85 mm, a vertical width D of about 45 mm, and a thickness of about 100 μm, for example. A clearance F between the third section 30*c* of the loop-shaped electrode 30 and the first electrode plate 50 preferably is about 300 μm, for example. A length G of the second section 30*b* preferably is about 2.2 mm, for example. A clearance K between the first section 30*a* and the second electrode plate 60 preferably is about 100 μm, for example. A width M of the loop-shaped electrode 30 preferably is about 200 μm, for example.

As is apparent from FIG. 8, the wireless IC device includes resonance points of Marker 1 and Marker 2. The Marker 1 is a resonance point of the loop-shaped electrode 30, and the Marker 2 is a resonance point of the first electrode plate 50. The resonance point of the Marker 1 varies with a dimension A of the coupling portion 33 and a spacing B with the first electrode plate 50. When the dimension A increases, the resonance point shifts toward the low frequency side. When the spacing B increases, the resonance point shifts toward the high frequency side. The resonance point of the Marker 2 varies with the horizontal width C and the vertical width D of the first electrode plate 50. When the horizontal width C increases, the resonance point shifts toward the low frequency side. When the vertical width D increases, the resonance point shifts toward the high frequency side.

Figure 9:
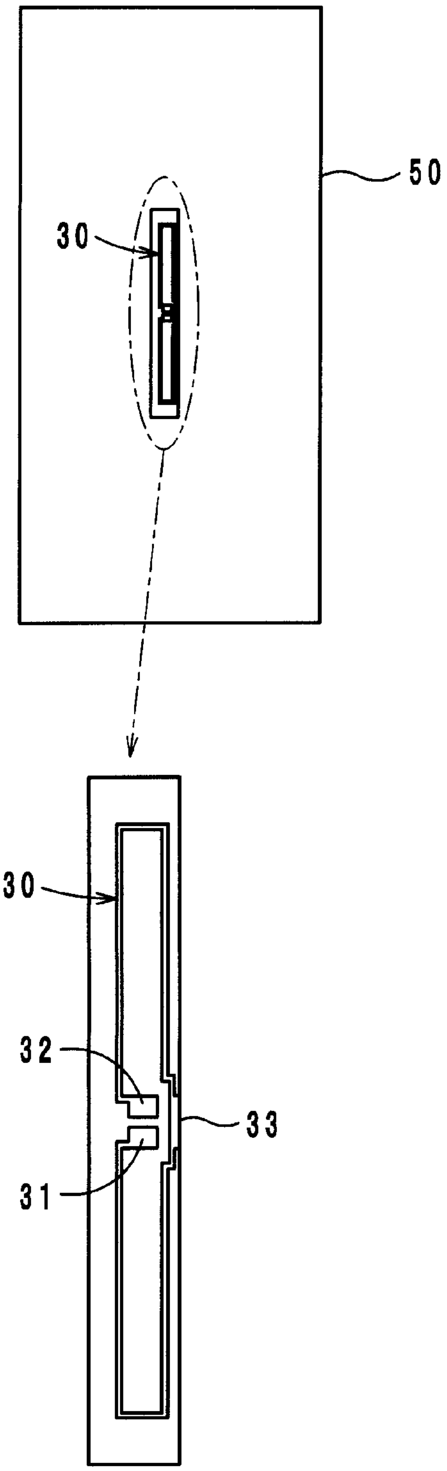
FIG. 9 is a plan view illustrating a process of forming a loop-shaped electrode.

Next, an example of a method for manufacturing the wireless IC device is explained. First, a metallic thin plate 50 (phosphoric bronze referred to as a hoop material can be preferably used or aluminum or other suitable material may be used) having a thickness of, for example, about 15 μm to about 150 μm is patterned, as shown in FIG. 9, by punching processing, etching processing or other suitable process to form the loop-shaped electrode 30. Next, the wireless IC chip 10 alone or the feed circuit board 20 having the wireless IC chip 10 mounted thereon is mounted (attached) on the end coupling portions 31 and 32 of the loop-shaped electrode 30.

Figure 10:
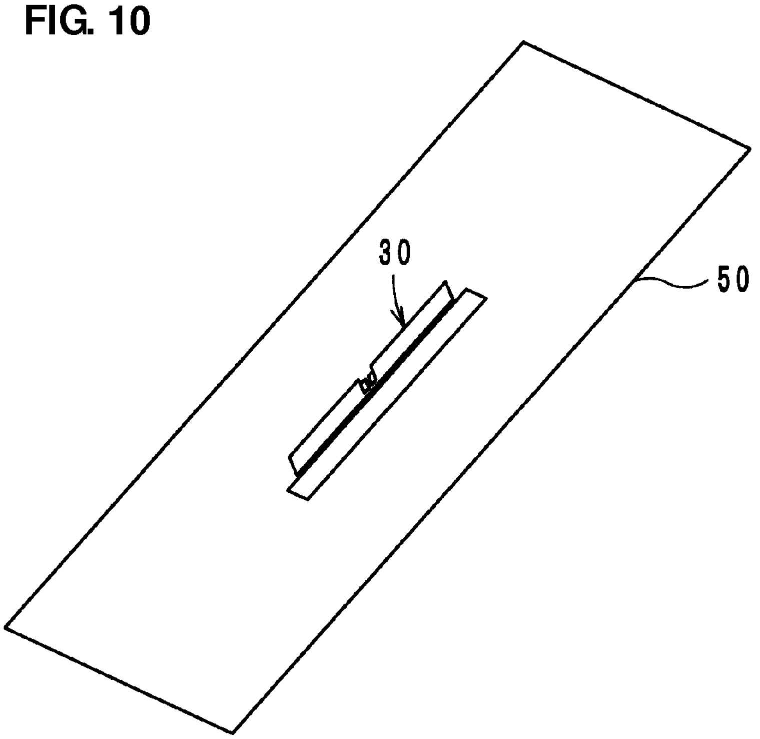
FIG. 10 is a perspective view illustrating a process of forming the loop-shaped electrode.

Next, as shown in FIG. 10, the loop-shaped electrode 30 is bent so as to be perpendicular to or tilted with respect to the first electrode plate 50. Then, the loop-shaped electrode 30, together with the wireless IC chip 10 and the feed circuit board 20, is covered by the resin material 55. The loop-shaped electrode 30 may be inserted into a styrene foam plate, for example. Then, the second electrode plate 60 is attached on the back side.

Second Preferred Embodiment

Figure 11:
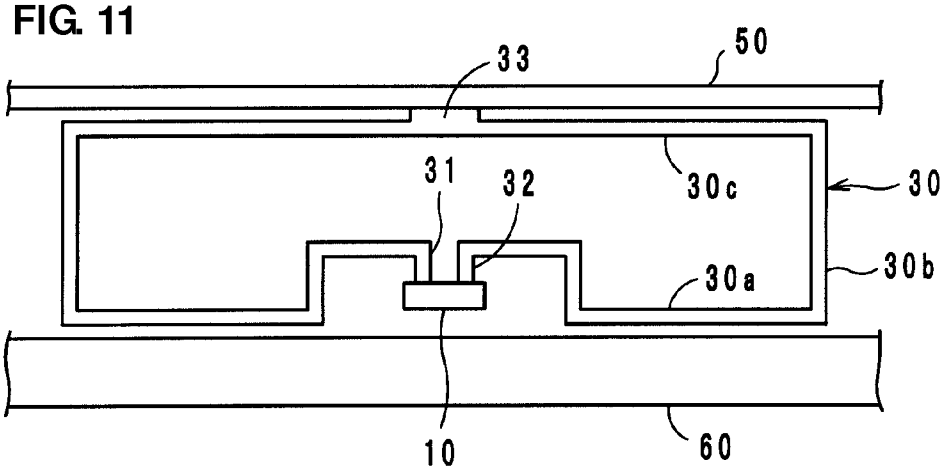
FIG. 11 is a front view illustrating a main section of a wireless IC device of a second preferred embodiment of the present invention.
Figure 12:
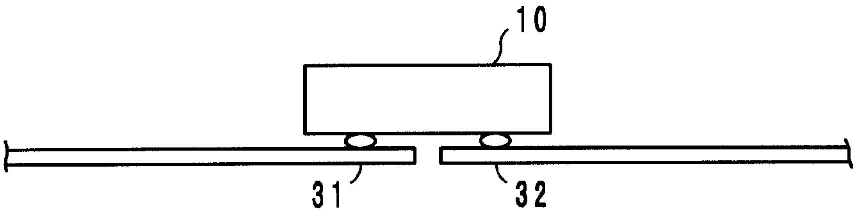
FIG. 12 is an explanatory diagram illustrating a main section of the wireless IC device of the second preferred embodiment of the present invention.

As shown in FIGS. 11 and 12, in a wireless IC device according to a second preferred embodiment of the present invention, the feed circuit board 20 is omitted with respect to the first preferred embodiment, and the wireless IC chip 10 alone is electrically coupled to the end coupling portions 31 and 32 of the loop-shaped electrode 30. Other configurations are the same as in the first preferred embodiment. The functions and effects of the present second preferred embodiment are basically the same as that of the first preferred embodiment, and, in particular, the loop-shaped electrode 30 functions also as an inductance matching element. Note that, the wireless IC chip 10 may be electromagnetically coupled to the loop-shaped electrode 30.

Third Preferred Embodiment

Figure 13:
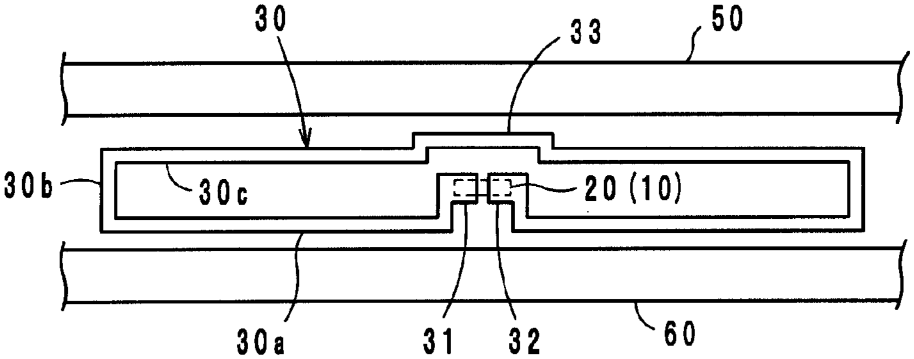
FIG. 13 is a front view illustrating a main section of a wireless IC device of a third preferred embodiment of the present invention.

As shown in FIG. 13, in a wireless IC device according to a third preferred embodiment of the present invention, the coupling portion 33 of the loop-shaped electrode 30 is electromagnetically coupled to the first electrode plate 50 instead of directly connected thereto. Other configurations are the same as in the first preferred embodiment, and the functions and effects are also the same as that of the first preferred embodiment.

Fourth Preferred Embodiment

Figure 14:
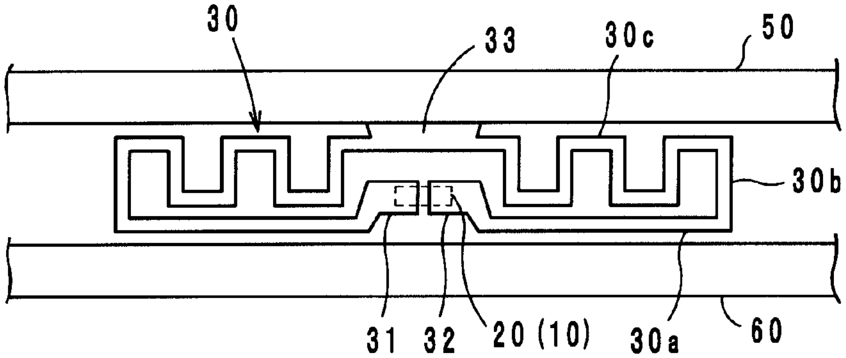
FIG. 14 is a front view illustrating a main section of a wireless IC device of a fourth preferred embodiment of the present invention.

As shown in FIG. 14, in a wireless IC device according to a fourth preferred embodiment, the third section 30*c* of the loop-shaped electrode 30 preferably has a meandering shape. Other configurations are the same as in the first preferred embodiment, and the functions and effects are also the same as that of the first preferred embodiment. In particular, the loop-shaped electrode 30 can have a very compact size.

Fifth Preferred Embodiment

Figure 15:
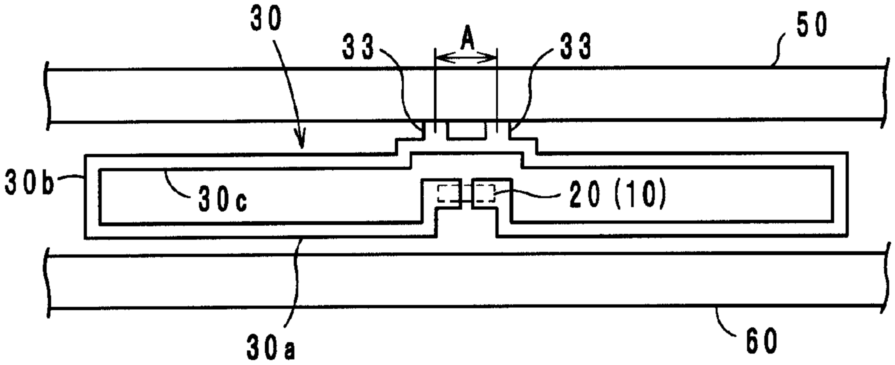
FIG. 15 is a front view illustrating a main section of a wireless IC device of a fifth preferred embodiment of the present invention.

As shown in FIG. 15, in a wireless IC device according to a fifth preferred embodiment, the coupling section 33 of the loop-shaped electrode 30 preferably is electrically coupled to the first electrode plate 50 at two sites. Other configurations are the same as in the first preferred embodiment, and the functions and effects are also the same as that of the first preferred embodiment. In particular, coupling force is increased, and the coupling amount can be adjusted in accordance with the dimension A. As the dimension A increases, the resonance point of the Marker 1, shown in FIG. 8, shifts toward the low frequency side.

Sixth Preferred Embodiment

Figure 16:
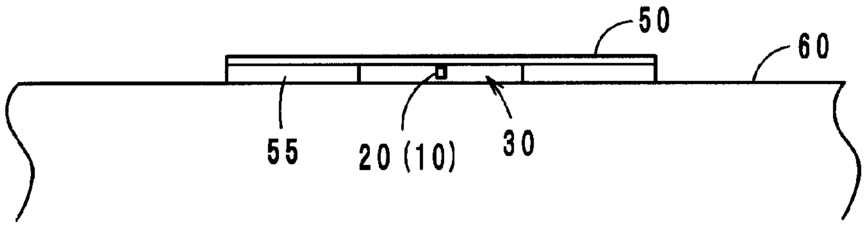
FIG. 16 is a front view illustrating a wireless IC device of a sixth preferred embodiment of the present invention.
Figure 17:
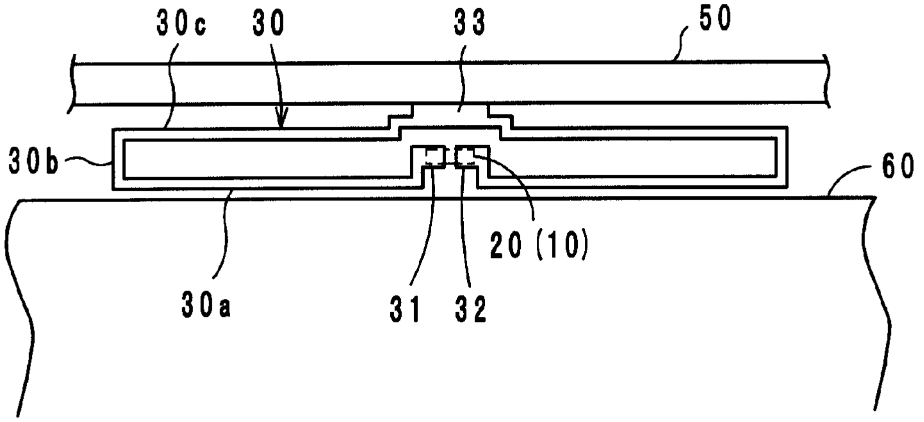
FIG. 17 is a front view illustrating a main section of the wireless IC device of the sixth preferred embodiment of the present invention.

As shown in FIGS. 16 and 17, in a wireless IC device according to a sixth preferred embodiment, a portion of a metallic article to which the wireless IC device is attached is preferably used as the second electrode plate 60. Other configurations are the same as in the first preferred embodiment, and the functions and effects are also the same as that of the first preferred embodiment. In this case, the metallic article is a very wide concept such as, for example, an iron/steel plate, or a door, a body or a license plate of an automobile, or may be an electrode of a printed wiring board. That is, the "wireless IC device" of the present invention is not limited to a module including an electrode plate which is used as a radiation plate, and a wireless IC, but may include an article itself.

Seventh Preferred Embodiment

Figure 18:
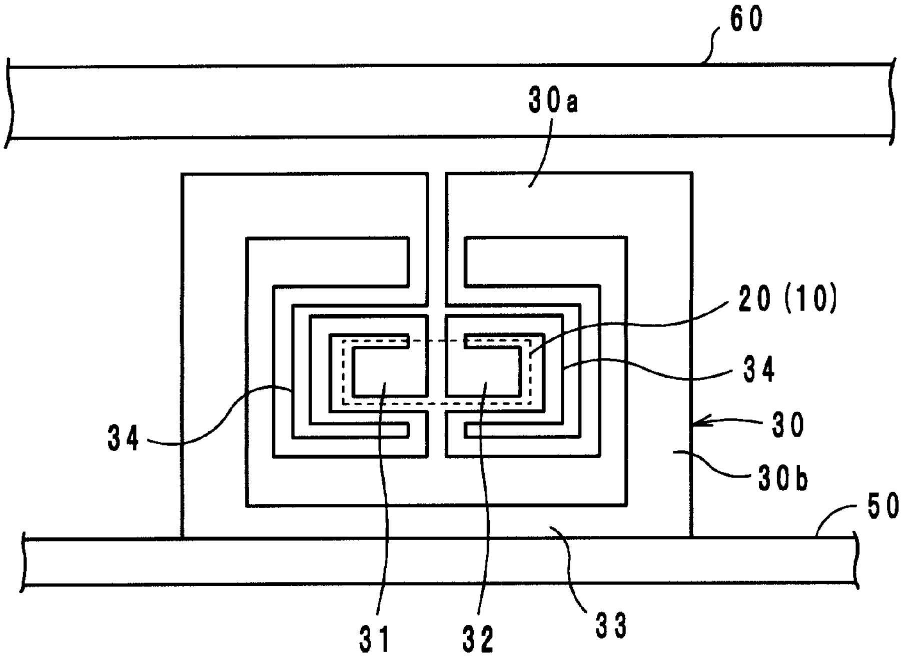
FIG. 18 is a front view illustrating a main section of a wireless IC device of a seventh preferred embodiment of the present invention.

As shown in FIG. 18, in a wireless IC device according to a seventh preferred embodiment, a meandering-shape impedance matching section 34 is provided on the end coupling portions 31 and 32 of the loop-shaped electrode 30, and the first section 30*a* and the second section 30*b* function as a loop surface. Other configurations are the same as in the first preferred embodiment, and the functions and effects are also the same as that of the first preferred embodiment.

Other Preferred Embodiments

Note that, the wireless IC device and the method for manufacturing the same according to the present invention are not limited to the foregoing preferred embodiments. Various modifications are possible within the scope of the present invention and various preferred embodiments and features of preferred embodiments can be combined as desired.

Accordingly, various preferred embodiments of the present invention are useful for a wireless IC device and a method for manufacturing the same, and in particular, are excellent in that the wireless IC device functions as a non-contact RFID system even when the wireless IC device is attached to an article containing metal, water, salt or the like, without hindering reduction in size and thickness.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless integrated circuit device comprising:

a wireless integrated circuit arranged to process a predetermined wireless signal;

a loop-shaped electrode coupled to the wireless integrated circuit and including a coupling portion; and a first metallic electrode plate and a second metallic electrode plate coupled to the loop-shaped electrode, the second metallic electrode plate having an area larger than an area of the first metallic electrode plate; wherein the wireless integrated circuit and the loop-shaped electrode are sandwiched between the first metallic electrode plate and the second metallic electrode plate;

the loop-shaped electrode is arranged such that a loop surface thereof is perpendicular to or tilted with respect to the first metallic electrode plate and the second metallic electrode plate;

the loop-shaped electrode is directly electrically connected to the first metallic electrode plate via the coupling portion and is electromagnetically coupled to the second metallic electrode plate; and the first and second metallic electrode plates are used for transmission and reception of the wireless signal.

2. The wireless integrated circuit device according to claim 1, wherein the loop-shaped electrode and the first metallic electrode plate are electrically coupled to each other, and the loop-shaped electrode and the second metallic electrode plate are electromagnetically coupled to each other.

3. The wireless integrated circuit device according to claim 1, wherein a feed circuit board including a feed circuit including a resonance circuit that operates at a predetermined resonant frequency is provided between the wireless integrated circuit and the loop-shaped electrode.

4. The wireless integrated circuit device according to claim 3, wherein the feed circuit includes inductance elements, and the feed circuit board and the loop-shaped electrode are electromagnetically coupled to each other via the inductance elements.

5. The wireless integrated circuit device according to claim 1, wherein at least a portion of a metallic article is used as the second metallic electrode plate.

6. A method for manufacturing a wireless integrated circuit device that includes a wireless integrated circuit arranged to process a predetermined wireless signal, a loop-shaped electrode coupled to the wireless integrated circuit and including a coupling portion, and a first metallic electrode plate and a second metallic electrode plate coupled to the loop-shaped electrode, the second metallic electrode plate having an area larger than an area of the first metallic electrode plate, wherein the wireless integrated circuit and the loop-shaped electrode are sandwiched between the first metallic electrode plate and the second metallic electrode plate, the loop-shaped electrode is arranged such that a loop surface thereof is perpendicular to or tilted with respect to the first metallic electrode plate and the second metallic electrode plate, the loop-shaped electrode is directly electrically connected to the first metallic electrode plate via the coupling portion and is electromagnetically coupled to the second metallic electrode plate, and the first and second metallic electrode plates are used for transmission and reception of the wireless signal, the method comprising the steps of:

patterning the first metallic electrode plate and the loop-shaped electrode on a sheet of a metallic plate; and bending the loop-shaped electrode so as to be perpendicular to or tilted with respect to the first metallic electrode plate.

* * * * *